(12) United States Patent
Zhou et al.

(10) Patent No.: US 7,656,952 B2
(45) Date of Patent: Feb. 2, 2010

(54) EXTENDED METHOD OF NOISE-ADAPTIVE MOTION DETECTION

(75) Inventors: Zhi Zhou, Irvine, CA (US); Yeong-Taeg Kim, Irvine, CA (US)

(73) Assignee: Samsung Electronics Co., Ltd., Suwon (KR)

( * ) Notice: Subject to any disclaimer, the term of this patent is extended or adjusted under 35 U.S.C. 154(b) by 1036 days.

(21) Appl. No.: 11/107,710

(22) Filed: Apr. 14, 2005

(65) Prior Publication Data

US 2006/0232713 A1   Oct. 19, 2006

(51) Int. Cl.
  *H04N 7/12* (2006.01)
(52) U.S. Cl. .............. 375/240.12; 375/240; 375/240.01
(58) Field of Classification Search ........... 375/240, 375/240.01, 240.12, 240.16; 348/701
See application file for complete search history.

(56) References Cited

U.S. PATENT DOCUMENTS

| 6,650,704 | B1 * | 11/2003 | Carlson et al. ......... 375/240.01 |
| 7,321,626 | B2 * | 1/2008 | Sun ....................... 375/240.16 |
| 2002/0080284 | A1 | 6/2002 | Kim et al. |
| 2002/0136305 | A1 | 9/2002 | Kim et al. |
| 2006/0103765 | A1 | 5/2006 | Zhou et al. |

\* cited by examiner

*Primary Examiner*—Allen Wong
(74) *Attorney, Agent, or Firm*—Kenneth L. Sherman, Esq.; Michael Zarrabian, Esq.; Myers Andras Sherman LLP

(57) ABSTRACT

A method of computing a motion decision signal for a video processing system, by: inputting a video signal including a video sequence of frames; filtering a frame in the video signal; computing a point-wise temporal local difference signal between the filtered frame and a next frame in the video sequence; computing a point-wise motion decision signal based on the temporal local difference signal.

36 Claims, 4 Drawing Sheets

EXTENDED METHOD OF NOISE-ADAPTIVE MOTION DETECTION

CROSS REFERENCE TO RELATED APPLICATIONS

The present invention relates to commonly-owned patent application entitled "An Extended Method to Estimate Noise Variance from a Video Sequence," U.S. patent application Ser. No. 11/187,528, filed on Jul. 21, 2005; patent application entitled "Method of Temporal Noise Reduction in Video Sequences," U.S. patent application Ser. No. 11/025,173, filed on Dec. 29, 2004; and patent application entitled "Method and System of Noise-Adaptive Motion Detection in an Interlaced Video Sequence," U.S. patent application Ser. No. 11/040,578, filed on Jan. 20, 2005.

FIELD OF THE INVENTION

The present invention relates generally to video processing, and more particularly to motion detection in video sequences.

BACKGROUND OF THE INVENTION

Motion detection is an important video processing technique, often utilized as a sub-function block in video processing applications such as video noise reduction, video de-interlacing, etc. The performance of such methods depends on how precisely motion is detected in a video sequence.

For example, motion detection is used in noise reduction to mix the temporal and spatial filtered values. A simple scheme is switching on temporal filtering in a non-motion region, and switching off temporal filtering in a motion region where spatial filtering is used instead. If motion detection fails motion blur may occur in the filtered video frame.

In another deinterlacing example, motion detection is used to mix the temporal and spatial interpolated values. Temporal interpolation is the best solution if there is no motion at the location where the value is to be interpolated. Otherwise, spatial interpolation should be used.

Existing motion detection methods are performed on the original video frames. In a TV system, noise reduction is often applied first to obtain noise-free video sequences. To reduce cost, generally only the original incoming frame and the previous filtered frames are saved into the memory. In that case, motion detection should be applied on an original frame and a previous filtered frame. The motion detection methods designed for two original frames are not optimal because the statistical characteristic of the filtered frame is different from the original frame.

BRIEF SUMMARY OF THE INVENTION

The present invention addresses the above shortcomings. In one embodiment the present invention provides a method of computing a point-wise motion decision signal for a video processing system, comprising the steps of: inputting a video signal with a video sequence of frames; filtering a frame in the video signal; computing a point-wise temporal local difference signal between the filtered frame and a next frame in the video sequence; computing a point-wise motion decision signal based on the frame difference signal.

In one version, the step of determining the point-wise temporal local difference signal further includes the steps of: computing a point-wise absolute difference signal between the filtered frame and a next frame in the video sequence and adjusting the absolute difference signal to ensure that all adjusted signals in non-motion region satisfy the same distribution; and low-pass filtering the adjusted difference signal prior to the step of computing the point-wise motion decision signals.

The present invention further provides systems to implement the above methods. Other embodiments, features and advantages of the present invention will be apparent from the following specification taken in conjunction with the following drawings.

DETAILED DESCRIPTION OF THE INVENTION

Figure 1:
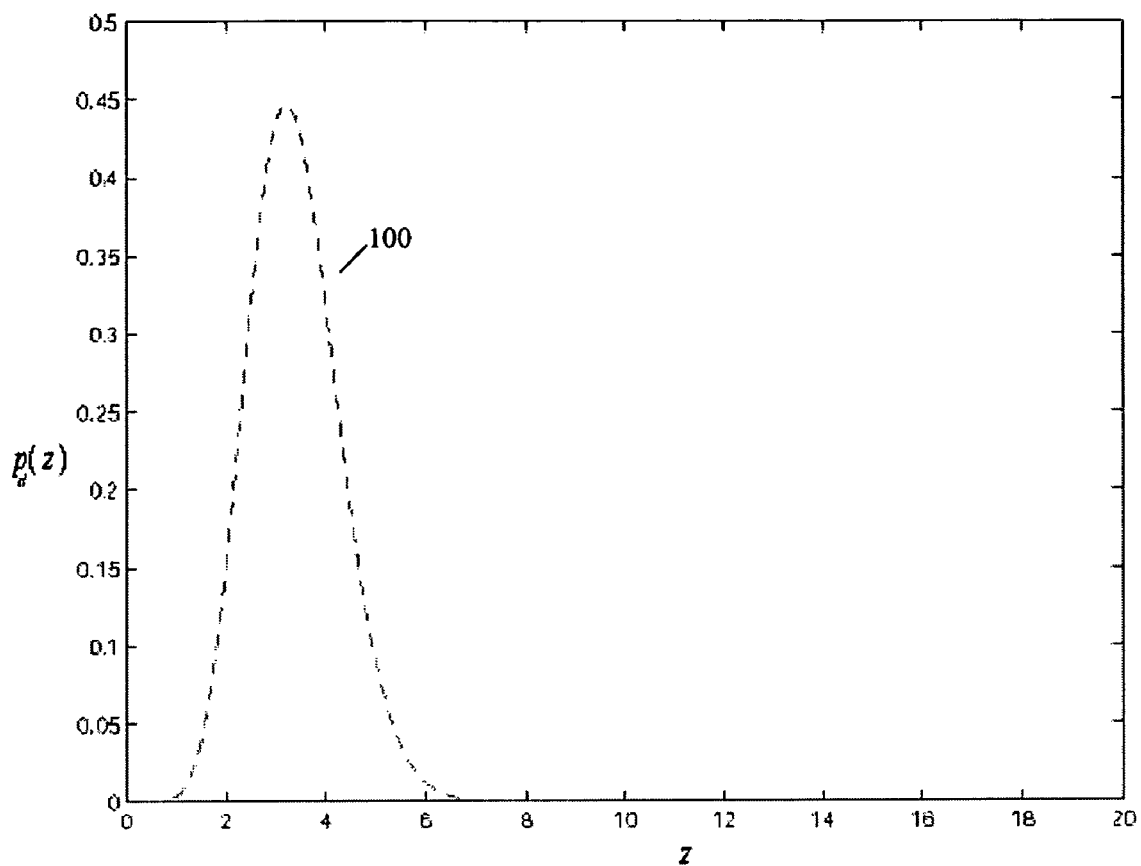
FIG. 1 shows an example distribution of the temporal local difference signal in non-motion region according to an embodiment of the present invention.
Figure 2A:
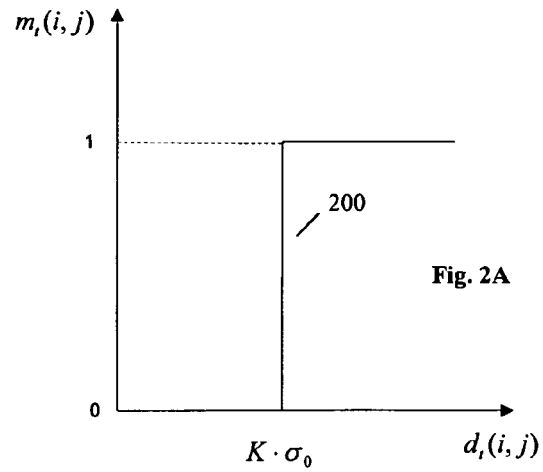
FIGS. 2A-F show examples of threshold functions for calculating a motion decision signal according to embodiments of the present invention.
Figure 2B:
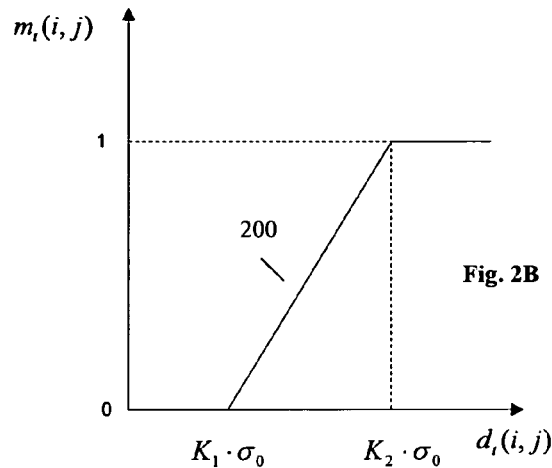
Figure 2C:
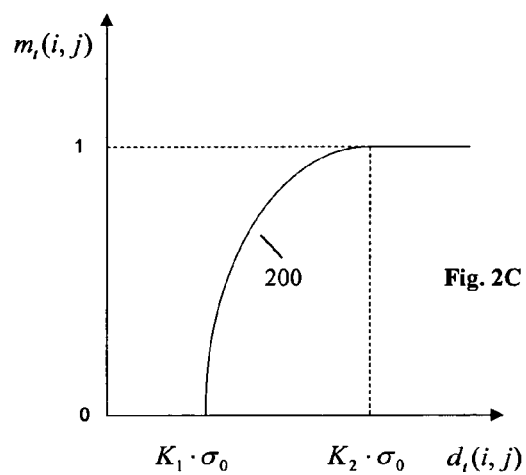
Figure 2D:
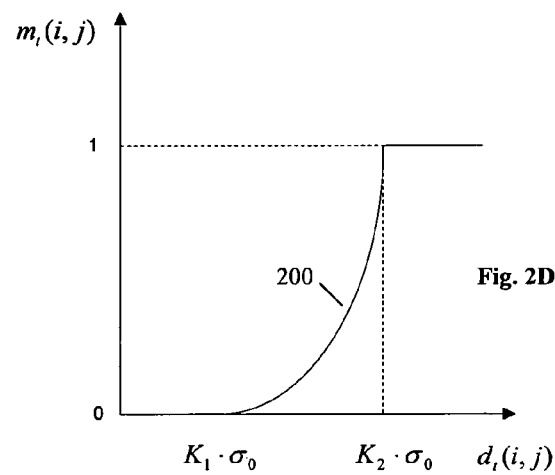
Figure 2E:
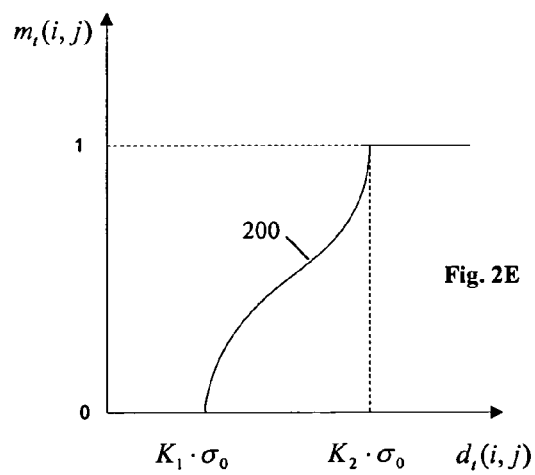
Figure 2F:
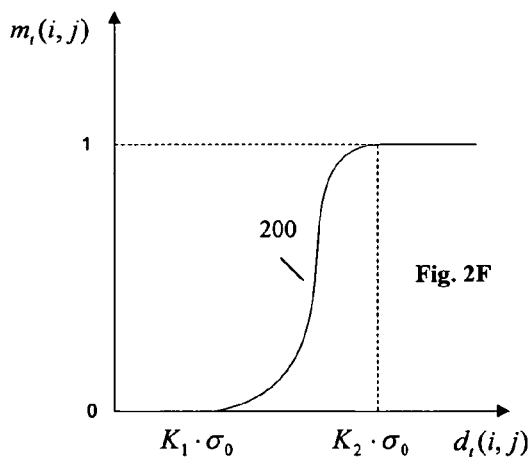

In one embodiment, the present invention provides an extended method of motion detection. In order to systematically describe an embodiment of an extended motion detection method of the present invention, let $g_t$ denotes the incoming video frame at time instant t and $g_t(i,j)$ denotes the corresponding pixel value at the coordinates (i,j) where i represents the ordinate and j represents the abscissa. The motion level of the pixel $g_t(i,j)$ is measured by the motion decision signal $m_t(i,j)$. For simplification of description, let $m_t(i,j)=0$ denote no motion and $m_t(i,j)=1$ denote motion. The value of the motion decision signal can be between 0 and 1 as well to measure smoother motion level.

Assume the input video sequence is corrupted by independent, identically distributed additive and stationary zero-mean Gaussian noise with variance $\sigma_0^2$, that is, any pixel $g_t(i,j)$ can be denoted as $$g_t(i,j)=f_t(i,j)+n_t(i,j),$$

where $f_t(i,j)$ denotes the true pixel value without noise corruption and $n_t(i,j)$ is the Gaussian distributed noise component. The noise variance $\sigma_0^2$ can be pre-detected by a separate noise estimation unit such as described by example in commonly assigned patent application titled "Methods to estimate noise variance from a video sequence", U.S. patent application Ser. No. 10/991,265, filed on Nov. 17, 2004, provides examples of noise estimation, incorporated herein by reference.

Let $\hat{g}_t$ denotes the filtered video frame of $g_t$. Commonly assigned patent application titled "Method of temporal noise reduction in video sequences", U.S. application Ser. No. 11/025,173, filed on Dec. 29, 2004, provides an example method to obtain $\hat{g}_t$, incorporated herein by reference. Pixel $\hat{g}_t(i,j)$ is obtained by the recursive temporal filtering as:

$$\hat{g}_t(i,j) = \frac{\hat{w}_{t-1}(i,j)\hat{g}_{t-1}(i,j) + g_t(i,j)}{\hat{w}_{t-1}(i,j)+1},$$

-continued $$w_t(i, j) = \hat{w}_{t-1}(i, j) + 1.$$

The value $\hat{w}_{t-1}(i,j)$ is a monotonically decreasing function of the motion decision signal $m_{t-1}(i,j)$ between the pixels $\hat{g}_{t-1}(i,j)$ and $g_t(i,j)$. If there is no motion ($m_{t-1}(i,j)=0$), $\hat{w}_{t-1}(i,j) = w_{t-1}(i,j)$. If there is motion ($m_{t-1}(i,j)=1$), $\hat{w}_{t-1}(i,j)=0$. If the value of the motion decision signal $m_{t-1}(i,j)$ is between, 0 and 1, the value $\hat{w}_{t-1}(i,j)$ is between $w_{t-1}(i,j)$ and 0. The initial value of $w_t(i,j)$ is set to 0.

Note that, if the motion decision signal $m_{t-1}(i,j)$ is binary, the value $\hat{w}_{t-1}(i,j)$ or $w_t(i,j)$ can only be an integer. Also, the temporal filtering function can be equivalently written as:

$$\hat{g}_t(i, j) = \frac{1}{w_t(i, j)} \sum_{p=0}^{w_t(i,j)-1} g_{t-p}(i, j).$$

Therefore, we can say that $\hat{g}_t(i,j)$ is an average value of $w_t(i,j)$ samples. It can be derived that the pixel $\hat{g}_t(i,j)$ is Gaussian distributed random variable with variance $\sigma_0^2/w_t(i,j)$. Because the noise variance $\sigma_0^2$ is pre-detected, the value $w_t(i,j)$ measures the residual noise in the filtered pixel $\hat{g}_t(i,j)$. For simplicity, when $m_{t-1}(i,j)$ and $\hat{w}_{t-1}(i,j)/w_t(i,j)$ are soft-switching values, we still say that the residue noise variance of $\hat{g}_t(i,j)$ is $\sigma_0^2/w_t(i,j)$. If other noise reduction methods are used, the equivalent value of $w_t(i,j)$ should also be obtained according to such methods.

To perform motion detection between a current frame $g_t$ and a previous filtered frame $\hat{g}_{t-1}$, the noise variance $\sigma_0^2$ and the value $w_{t-1}(i,j)$ are already known, provided by noise estimation and noise reduction units, respectively, based on the above analysis. It should be noted that motion detection between two original frames is only a special case of the present invention when $w_{t-1}(i,j)$ is always equal to 1. As such, the present invention is not limited to the examples described herein.

Hereinafter, an example motion detection method and apparatus according to the present invention are described with reference to the drawings. In order to obtain the point-wise temporal local difference signal, first the absolute difference signal $B_t$ is computed between the current frame $g_t$ and the previous filtered frame $\hat{g}_{t-1}$ as:

$$B_t = |g_t - \hat{g}_{t-1}|. \tag{1}$$

Then, the absolute difference signal is adjusted as $$D_t(i, j) = \sqrt{\frac{2w_{t-1}(i, j)}{w_{t-1}(i, j) + 1}} B_t(i, j). \tag{2}$$

Based on the example analysis in the commonly assigned patent application titled "An Extended method to estimate noise variance from a video sequence", U.S. patent application Ser. No. 11/187,528, filed on Jul. 21, 2005, incorporated herein by reference, it can be shown that the adjusted signal $D_t(i,j)$ in non-motion region is a random variable. Note that, the adjustment term $\sqrt{2w_{t-1}(i,j)/(w_{t-1}(i,j)+1)}$ in relation (2) guarantees that all the adjusted signals in non-motion region satisfy the same distribution. Let the probability density function (p.d.f.) of the distribution of such $D_t(i,j)$ be $p_D(y)$, which is represented as:

$$p_D(y) = \begin{cases} \frac{1}{\sqrt{\pi}\,\sigma_0} \exp\left(-\frac{y^2}{4\sigma_0^2}\right) & y > 0 \\ \frac{1}{\sqrt{\pi}\,2\sigma_0} & y = 0 \\ 0 & y < 0. \end{cases}$$

The signal $D_t$ is then low pass filtered to obtain the temporal local difference signal $d_t$ as:

$$d_t = \text{LPF}(D_t) \tag{3}$$

where $\text{LPF}(\cdot)$ represents a low pass filtering process over the input video signal. The M×N kernel, $W_{M \times N}$, in general, of the low pass filter, $\text{LPF}(\cdot)$, can be expressed as:

$$W_{M \times N} = \begin{bmatrix} w_{11} & w_{12} & \cdots & w_{1N} \\ w_{21} & w_{22} & \cdots & w_{2N} \\ \vdots & \vdots & \ddots & \vdots \\ w_{M1} & w_{M2} & \cdots & w_{MN} \end{bmatrix}$$

where $(w_{11}, \ldots, w_{MN})$ represents a set of predetermined normalized coefficients $$\left(\text{i.e.,} \sum_{p=1}^{M} \sum_{q=1}^{N} w_{p,q} = 1\right).$$

Any filtered result in non-motion region of $d_t$ is also a random variable with the expectation and the variance as:

$$E(d_t(i, j)) = \frac{2}{\sqrt{\pi}} \sigma_0,$$

$$\text{Var}(d_t(i, j)) = \frac{2(\pi - 2)}{\pi} \sigma_0^2 \sum_{p=1}^{M} \sum_{q=1}^{N} w_{pq}^2.$$

The p.d.f. of the temporal local difference $d_t(i,j)$ in non-motion region, denoted as $p_d(z)$, depends on the low pass filter $\text{LPF}(\cdot)$. An example of such distribution is now provided. If the noise standard deviation is $\sigma_0=3.0$, and the kernel is:

$$W_{3 \times 3} = \begin{bmatrix} 1/8 & 1/8 & 1/8 \\ 1/8 & 0 & 1/8 \\ 1/8 & 1/8 & 1/8 \end{bmatrix},$$

then $p_d(z)$ is shown as curve 100 in FIG. 1.

It should be noted that the characteristic of the $\text{LPF}(\cdot)$ can be all-pass filter depending on the choice of the kernel $W_{M \times N}$. That is, if the kernel is set as $M=N=1$ and $w_{11}=1$, then $\text{LPF}(\cdot)$ becomes the all-pass filter and, thus, $d_t = D_t$.

Based on the above analysis, the point-wise motion decision signal $m_t(i,j)$ can be computed as $$m_t(i,j) = T(d_t(i,j)) \tag{4}$$

where $T(\cdot)$ denotes a threshold function. This example implementation is based on the assumption that the larger the temporal local difference $d_t(i,j)$ is, the higher the value of the motion decision signal should be obtained. Therefore, $T(\cdot)$ is a monotonically increasing function. FIGS. 2A-F show six examples of T(·) shown as curves 200, where K, $K_1$, and $K_2$ are constant values. Other implementations are also possible. Note that, in these examples, the thresholds are automatically adjusted according to the noise standard deviation of the video sequence. Robust performance thus can be obtained against noise.

Referring to the example block diagram in FIG. 3, an example system 300 according to the present invention which implements the above method (relations (1), (2), (3) and (4)) for computing the motion decision signal $m_t(i,j)$ is discussed below. The example system 300 comprises a Noise Reduction function 302, a Memory 303, an Adder 304, an absolute value function (ABS) 306, a Square Root calculator 308, a Multiplier 310, a Spatial Low Pass Filter (LPF) 311 and a Threshold Function 312.

Figure 3:
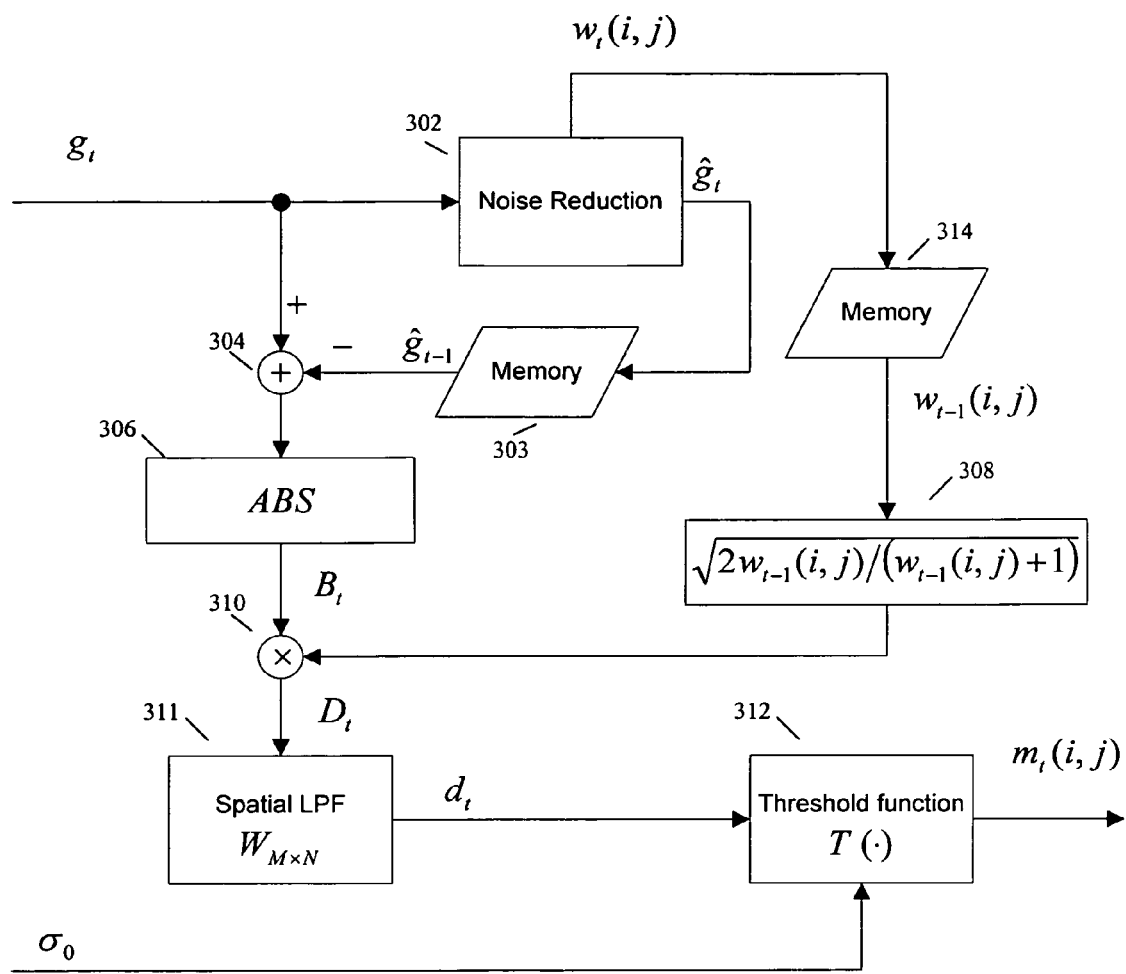
FIG. 3 shows a block diagram of an extended motion detection system according to an embodiment of the present invention.

In the system 300 of FIG. 3, the Noise Reduction function 302 inputs $g_t$ and calculates $\hat{g}_t$ and $w_t(i,j)$. The value $\hat{g}_t$ is saved in the Memory 303, wherein the output $\hat{g}_{t-1}$ of the Memory 303 is subtracted from $g_t$ by the Adder 304 to generate $g_t - \hat{g}_{t-1}$. Absolute value of $g_t - \hat{g}_{t-1}$ is calculated by the ABS 306. The value $w_t(i,j)$ is saved in the Memory 314, wherein the output $w_{t-1}(i,j)$ is used by the Square Root 308 to calculate $\sqrt{2w_{t-1}(i,j)/(w_{t-1}(i,j)+1)}$. Then the outputs of ABS 306 and the Square Root 308 are multiplied by the Multiplier 310 to generate $D_t$. Then $D_t$ is filtered in the Spatial LPF 311 (having said $W_{M \times N}$ kernel) to generate $d_t$. Then, $d_t$ is provided to the Threshold function T(·) 312 which utilizes $\sigma_0$ along with $d_t$, to generate $m_t(i,j)$.

The constant values K, $K_1$, and $K_2$ can be determined by the distribution $p_d(z)$, such as $$K = \arg_z \int_{z\sigma_0}^{\infty} p_d(z) dz < e,$$  (35)

where e is the error probability of detecting a non-motion pixel as a motion pixel.

Generally, the neighboring pixels have similar characteristics, that is, they are probably associated with the same value $w_{t-1}(i,j)$. Therefore, relations (1), (2) and (3) in the above implementation can be simplified to $$B_t = |g_t - \hat{g}_{t-1}|,$$  (5)

$$D_t = LPF(B_t),$$  (6)

$$d_t(i,j) = \sqrt{\frac{2w_{t-1}(i,j)}{w_{t-1}(i,j)+1}} \cdot D_t(i,j).$$  (7)

Referring to the example block diagram in FIG. 4, an example system 400 according to the present invention which implements the above simplified method (relations (5), (6) and (7)) for computing the motion decision signal $m_t(i,j)$ is discussed below. The example system 400 comprises a Noise Reduction function 402, a Memory 404, an Adder 406, an absolute value function (ABS) 408, a Square Root calculator 410, a Multiplier 412, a Spatial Low Pass Filter (LPF) 414 and a Threshold Function 416.

Figure 4:
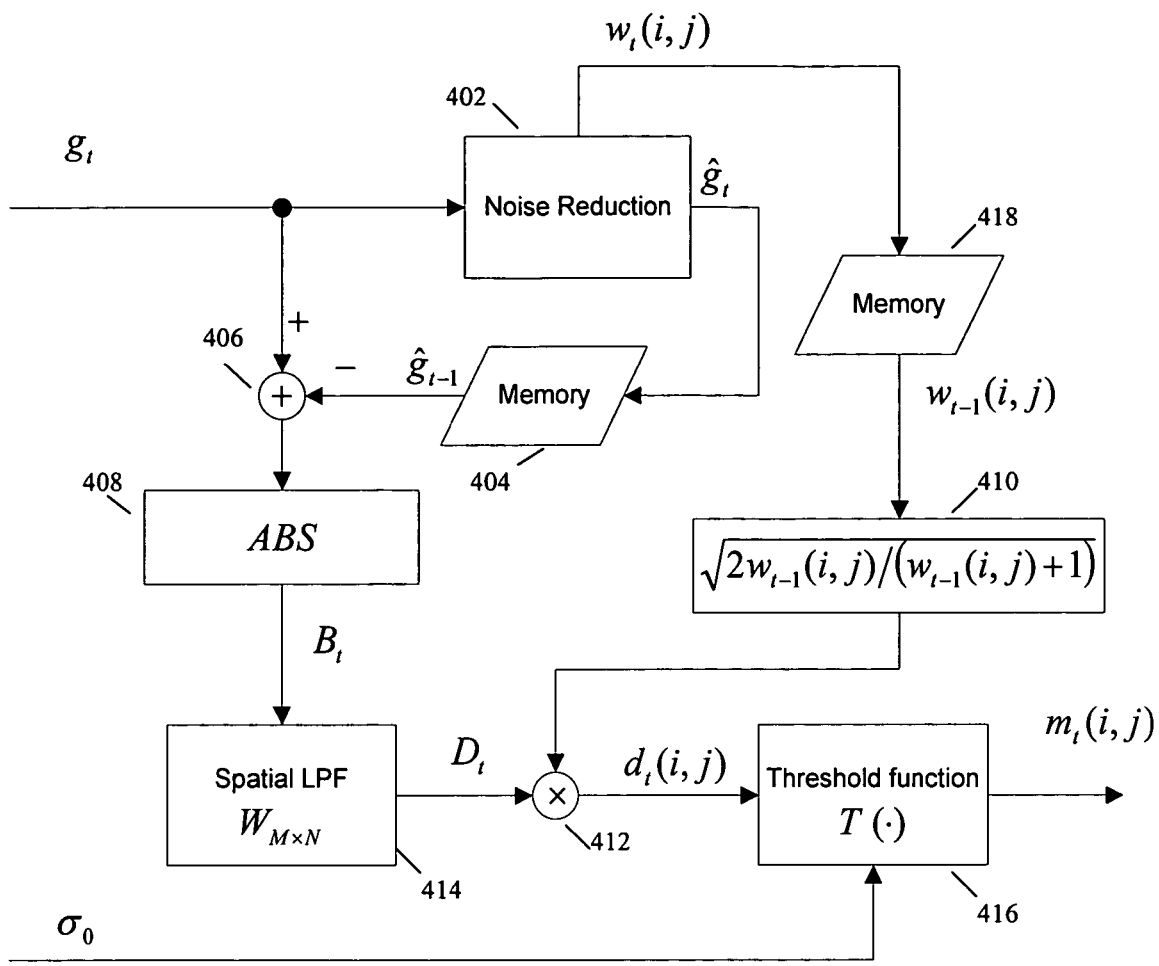
FIG. 4 shows a block diagram of a simplified extended motion detection system according to another embodiment of the present invention.

In the system 400 of FIG. 4, the Noise Reduction function 402 inputs $g_t$ and calculates $\hat{g}_t$ and $w_t(i,j)$. The values $\hat{g}_t$ is saved in the Memory 404, wherein the output $\hat{g}_{t-1}$ of the Memory 404 is subtracted from $g_t$ by the Adder 406 to generate $g_t - \hat{g}_{t-1}$. Absolute value of $g_t - \hat{g}_{t-1}$ is calculated by the ABS 408 to generate $B_t$. The value $w_t(i,j)$ is saved into Memory 418, where in the output $w_{t-1}(i,j)$ is used by the Square Root 410 to calculate $\sqrt{2w_{t-1}(i,j)/(w_{t-1}(i,j)+1)}$. Then the outputs of ABS 408 is input to the Spatial LPF 414, and the output of the Spatial LPF 414 is multiplied with the output of the Square Root calculator 410 using the Multiplier 412 to generate $d_t(i,j)$. Then $d_t(i,j)$ of the Multiplier 412 is input to the Threshold function T(·) 416 to generate $m_t(i,j)$ as discussed. The output $m_t(i,j)$ of the system 400 is very close to the output $m_t(i,j)$ of the system 300.

As those skilled in the art will recognize, the present invention can be used on both progressive and interlaced videos. The even and odd fields in an interlaced video can be processed as two separate progressive video sequences; or the fields can be merged into a single frame prior to be processed.

The present invention can be used in any video processing application which requires motion detection algorithm, such as noise reduction, deinterlacing, etc.

The present invention has been described in considerable detail with reference to certain preferred versions thereof; however, other versions are possible. Therefore, the spirit and scope of the appended claims should not be limited to the description of the preferred versions contained herein.

What is claimed is:

1. In a video signal processing system, a method of computing a motion decision signal comprising:
   employing a video processor for:
      inputting a video signal including a video sequence of noisy frames;
      filtering a current noisy frame in the video sequence to generate a current noise-reduced filtered frame;
      computing a point-wise temporal local difference signal of the corresponding pixel values between the current noise-reduced filtered frame and a next noisy frame in the video sequence;
      computing a point-wise motion decision signal based on the temporal local difference signal, wherein the point-wise motion decision signal represents a motion level.

2. The method of claim 1 wherein computing a point-wise motion decision signal further includes computing the point-wise motion decision signal based on the temporal local difference signal and noise in the video sequence.

3. The method of claim 2 wherein the point-wise motion decision signal is noise-adaptive.

4. The method of claim 1 wherein computing the point-wise motion decision signal further includes forming the point-wise motion decision signal based on the temporal local difference signal and one or more threshold values.

5. The method of claim 4 wherein the threshold values are functions of noise in the video sequence.

6. The method of claim 4 wherein computing the point-wise motion decision signal further includes:
   comparing the temporal local difference signal to one or more threshold values; and,
   forming the point-wise motion decision signal based on the comparison results.

7. The method of claim 1 wherein filtering a current noisy frame includes temporally filtering the current noisy frame.

8. The method of claim 1 wherein computing the point-wise temporal local difference signal further includes:
   computing the point-wise absolute difference signal between the current noise-reduced filtered frame and the next noisy frame in the video sequence;

adjusting the absolute difference signal to ensure that all adjusted signals in non-motion region satisfy the same distribution;

low-pass filtering the adjusted signal prior to the step of computing the point-wise motion decision signal.

9. The method of claim 8 further including computing the absolute difference signal $B_t$ as comprises computing $$B_t = |g_t - \hat{g}_{t-1}|,$$

where $g_t$ denotes the incoming noisy video frame at time instant t; and $\hat{g}_{t-1}$ denotes the filtered video frame of $g_{t-1}$.

10. The method of claim 8 wherein adjusting the absolute difference signal $B_t$ comprises computing $$D_t(i, j) = \sqrt{\frac{2w_{t-1}(i, j)}{w_{t-1}(i, j) + 1}} B_t(i, j),$$

where $w_{t-1}(i,j)$ measures the residual noise in the filtered pixel $\hat{g}_{t-1}(i,j)$, and where $B_t = |g_t - \hat{g}_{t-1}|$, where $g_t$ denotes the incoming noisy video frame at time instant t; and $\hat{g}_{t-1}$ denotes the filtered video frame of $g_{t-1}$.

11. The method of claim 8 further including low-pass filtering the adjusted signal $D_t$ to obtain the temporal local difference signal prior to the step of computing the point-wise motion decision signal, by calculating $d_t = LPF(D_t)$, where $LPF(\cdot)$ represents a low pass filtering process over the input signal.

12. The method of claim 11 further comprising ensuring that all values in non-motion region of the temporal local difference signal satisfy the same distribution prior to the step of computing the point-wise motion decision signal.

13. The method of claim 1 wherein computing the point-wise temporal local difference signal further includes:

computing the point-wise absolute difference signal between the current noise-reduced filtered frame and the next noisy frame in the video sequence;

low-pass filtering the absolute difference signal;

adjusting the filtered signal to ensure that all adjusted signals in non-motion region satisfy the same distribution.

14. The method of claim 13 further including computing the absolute difference signal $B_t$ as comprises computing $$B_t = |g_t - \hat{g}_{t-1}|,$$

where $g_t$ denotes the incoming video frame at time instant t; and $\hat{g}_{t-1}$ denotes the filtered video frame of $g_{t-1}$.

15. The method of claim 13 wherein low-pass filtering the absolute difference signal $B_t$ comprises computing $D_t = LPF(B_t)$, where $LPF(\cdot)$ represents a low pass filtering process over the input signal.

16. The method of claim 13 further including adjusting the filtered signal $D_t$ prior to computing the point-wise motion decision signal, by calculating $$d_t(i, j) = \sqrt{\frac{2w_{t-1}(i, j)}{w_{t-1}(i, j) + 1}} \cdot D_t(i, j)$$

where $w_{t-1}(i,j)$ measures the residual noise in the filtered pixel $\hat{g}_{t-1}(i,j)$.

17. The method of claim 16 further comprising ensuring that all values in non-motion region of the temporal local difference signal satisfy the same distribution prior to the step of computing the point-wise motion decision signal.

18. The method of claim 1 wherein filtering the current noisy frame further includes:

reducing noise in the current noisy frame by performing motion-adaptive temporal noise reduction based on the current noisy frame and a previous noise-reduced frame; and, saving the current noise-reduced frame into memory for filtering the next frame in the sequence.

19. In a video signal processing system, an apparatus for computing a motion decision signal, comprising:

an input for receiving a video signal including a video sequence of noisy frames;

a filter for filtering a current noisy frame in the video sequence to generate a current noise-reduced filtered frame;

a local difference calculator for computing a point-wise temporal local difference signal of the corresponding pixel values between the current noise-reduced filtered frame and a next noisy frame in the video sequence; and a motion value calculator for computing a point-wise motion decision signal based on the temporal local difference signal, wherein the point-wise motion decision signal represents a motion level.

20. The apparatus of claim 19 wherein the motion value calculator further computes the point-wise motion decision signal based on the temporal local difference signal and noise in the video sequence.

21. The apparatus of claim 20 wherein the point-wise motion decision signal is noise-adaptive.

22. The apparatus of claim 19 wherein the motion value calculator further forms the point-wise motion decision signal based on the temporal local difference signal and one or more threshold values.

23. The apparatus of claim 22 wherein the threshold values are functions of noise in the video sequence.

24. The apparatus of claim 22 wherein the motion value calculator further compares the temporal local difference signal to one or more threshold values, and forms the point-wise motion decision signal based on the comparison results.

25. The apparatus of claim 19 wherein the filter for filtering the current noisy frame temporally filters the frame.

26. The apparatus of claim 19 wherein the filter further comprising:

a motion-adaptive noise reducer that reduces noise in a current noisy frame by performing motion-adaptive temporal noise reduction based on the current noisy frame and a previous noise-reduced frame; and, memory for saving the current noise-reduced frame into memory for filtering the next frame in the sequence.

27. In a video signal processing system, an apparatus for computing a motion decision signal, comprising:

an input for receiving a video signal including a video sequence of noisy frames;

a filter for filtering a current noisy frame in the video sequence to generate a current noise-reduced filtered frame;

a local difference calculator for computing a point-wise temporal local difference signal of the corresponding pixel values between the current noise-reduced filtered frame and a next noisy frame in the video sequence which further computes a point-wise absolute difference signal between the current noise-reduced filtered frame and a next noisy frame in the video sequence, adjusts the absolute difference signal to ensure that all adjusted signals in non-motion region satisfy the same distribution, and low-pass filters the adjusted signal prior to the step of computing the point-wise motion decision signal; and a motion value calculator for computing a point-wise motion decision signal based on the temporal local difference signal, wherein the point-wise motion decision signal represents a motion level.

28. The apparatus of claim 27 wherein the point-wise absolute difference signal comprises $$B_t = |g_t - \hat{g}_{t-1}|,$$

where $g_t$ denotes the incoming video frame at time instant t; and $\hat{g}_{t-1}$ denotes the filtered video frame of $g_{t-1}$.

29. The apparatus of claim 27 wherein the local difference calculator further adjusts the absolute difference signal to ensure that all adjusted signals in non-motion region satisfy the same distribution by computing $$D_t(i, j) = \sqrt{\frac{2w_{t-1}(i, j)}{w_{t-1}(i, j) + 1}} \, B_t(i, j),$$

where $w_{t-1}(i,j)$ measures the residual noise in the filtered pixel $\hat{g}_{t-1}(i,j)$.

30. The apparatus of claim 27 wherein the local difference calculator low-pass filters the adjusted signal $D_t$ to obtain the temporal local difference signal prior to the step of computing the point-wise motion decision signal computes $d_t = \text{LPF}(D_t)$, where $\text{LPF}(\cdot)$ represents a low pass filtering process over the input signal.

31. The apparatus of claim 27 wherein the local difference calculator adjusts the absolute difference signal to ensure that all signals in non-motion region satisfy the same distribution prior to the step of computing the point-wise motion decision signal.

32. In a video signal processing system, an apparatus for computing a motion decision signal, comprising:

an input for receiving a video signal including a video sequence of noisy frames;

a filter for filtering a current noisy frame in the video sequence to generate a current noise-reduced filtered frame;

a local difference calculator for computing a point-wise temporal local difference signal of the corresponding pixel values between the current noise-reduced filtered frame and a next noisy frame in the video sequence which further computes a point-wise absolute difference signal between the current noise-reduced filtered frame and a next noisy frame in the video sequence, low-pass filters the absolute difference signal; and adjusts the filtered signal to ensure that all adjusted signals in non-motion region satisfy the same distribution; and, a motion value calculator for computing a point-wise motion decision signal based on the temporal local difference signal, wherein the point-wise motion decision signal represents a motion level.

33. The apparatus of claim 32 wherein the point-wise absolute difference signal comprises $$B_t = |g_t - \hat{g}_{t-1}|,$$

where $g_t$ denotes the incoming video frame at time instant t; and $\hat{g}_{t-1}$ denotes the filtered video frame of $g_{t-1}$.

34. The apparatus of claim 32 wherein the local difference calculator low-pass filters the absolute difference signal $B_t$ computes $D_t = \text{LPF}(B_t)$, where $\text{LPF}(\cdot)$ represents a low pass filtering process over the input signal.

35. The apparatus of claim 32 wherein the local difference calculator further adjusts the filtered signal $D_t$ prior to the step of computing the point-wise motion decision signal computes $$d_t(i, j) = \sqrt{\frac{2w_{t-1}(i, j)}{w_{t-1}(i, j) + 1}} \cdot D_t(i, j)$$

where $w_{t-1}(i,j)$ measures the residual noise in the filtered pixel $\hat{g}_{t-1}(i,j)$.

36. The apparatus of claim 35 wherein the local difference calculator adjusts the absolute difference signal to ensure that all signals in non-motion region of the temporal local difference signal satisfy the same distribution prior to the step of computing the point-wise motion decision signal.

* * * * *